(12) United States Patent
Tsutsumi et al.

(10) Patent No.: US 9,176,306 B2
(45) Date of Patent: Nov. 3, 2015

(54) IMAGING LENS AND IMAGING APPARATUS

(71) Applicant: FUJIFILM Corporation, Tokyo (JP)

(72) Inventors: Katsuhisa Tsutsumi, Saitama-ken (JP); Yoshiaki Ishii, Saitama-ken (JP)

(73) Assignee: FUJIFILM COPORATION, Tokyo (JP)

( * ) Notice: Subject to any disclaimer, the term of this patent is extended or adjusted under 35 U.S.C. 154(b) by 0 days.

(21) Appl. No.: 14/151,154

(22) Filed: Jan. 9, 2014

(65) Prior Publication Data

US 2014/0126071 A1    May 8, 2014

Related U.S. Application Data

(63) Continuation of application No. PCT/JP2012/004647, filed on Jul. 23, 2012.

(30) Foreign Application Priority Data

Jul. 29, 2011   (JP) ................. 2011-166422

(51) Int. Cl.
*G02B 9/00* (2006.01)
*G02B 13/04* (2006.01)
(Continued)

(52) U.S. Cl.
CPC ........ *G02B 13/04* (2013.01); *G02B 9/00* (2013.01); *G02B 9/34* (2013.01); *G02B 13/004* (2013.01); *G02B 13/005* (2013.01); *G02B 13/006* (2013.01)

(58) Field of Classification Search
CPC .............. G02B 9/00; G02B 9/34; G02B 9/58; G02B 13/00; G02B 13/001; G02B 13/0015; G02B 13/006
USPC .......... 359/686, 738, 739, 740, 771, 781, 782
See application file for complete search history.

(56) References Cited

U.S. PATENT DOCUMENTS 4,674,844 A * 6/1987 Nishioka et al. ............. 359/782
5,530,591 A   6/1996 Tachihara et al.
(Continued)

FOREIGN PATENT DOCUMENTS

JP  02-284108   11/1990
JP  07-174966    7/1995
(Continued)

OTHER PUBLICATIONS

International Search Report, PCT/JP2012/004647, Dec. 4, 2012.
Chinese Official Action—201280037815.6—Jun. 23, 2015.

*Primary Examiner* — Scott J Sugarman
*Assistant Examiner* — William R Alexander
(74) *Attorney, Agent, or Firm* — Young & Thompson

(57) ABSTRACT

An imaging lens provided with a negative first lens group and a positive second lens group arranged in order from the object side. The first lens group is composed of a first group first lens which is a biconcave negative single lens, and the second lens group is composed of a positive second group first lens, an aperture stop, a positive second group second lens, and a negative second group third lens arranged in order from the object side, in which the second group second lens and the second group third lens are cemented together to form a cemented lens. When f1 and f2 are taken as the focal lengths of the first group first lens and the second group first lens respectively, the imaging lens satisfies a conditional expression (4a'): $0.62 < |f1/f2| < 0.82$.

19 Claims, 8 Drawing Sheets

FIRST EMBODIMENT

(51) Int. Cl.
  *G02B 9/34* (2006.01)
  *G02B 13/00* (2006.01)

(56) References Cited

U.S. PATENT DOCUMENTS

| | | | |
|---|---|---|---|
| 5,724,190 A | | 3/1998 | Tachihara et al. |
| 5,774,279 A | * | 6/1998 | Kiriki et al. .................... 359/753 |
| 6,043,941 A | | 3/2000 | Yamada et al. |
| 6,476,851 B1 | | 11/2002 | Nakamura |

FOREIGN PATENT DOCUMENTS

| | | |
|---|---|---|
| JP | 08-160339 | 6/1996 |
| JP | 09-281387 | 10/1997 |
| JP | 10-039207 | 2/1998 |
| JP | 10-239594 | 9/1998 |
| JP | 2004-020972 | 1/2004 |
| JP | 2005-024969 | 1/2005 |
| JP | 2005-316208 | 11/2005 |
| JP | 2011-128210 | 6/2011 |

* cited by examiner

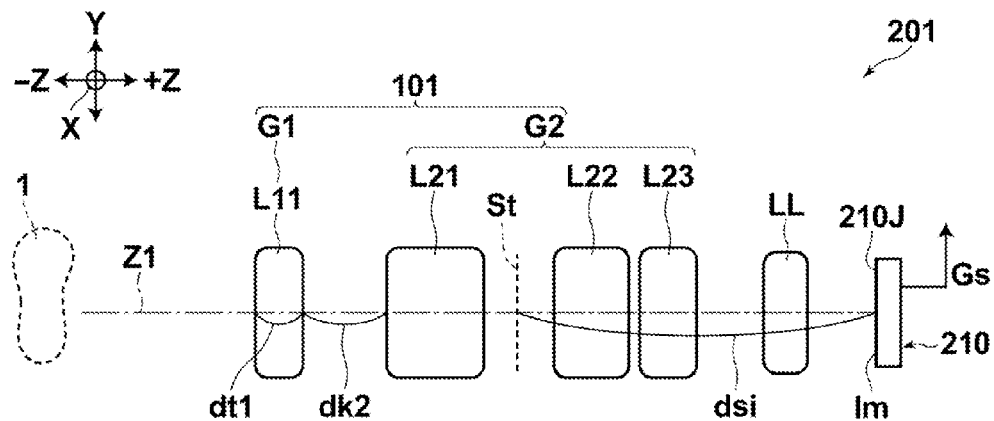
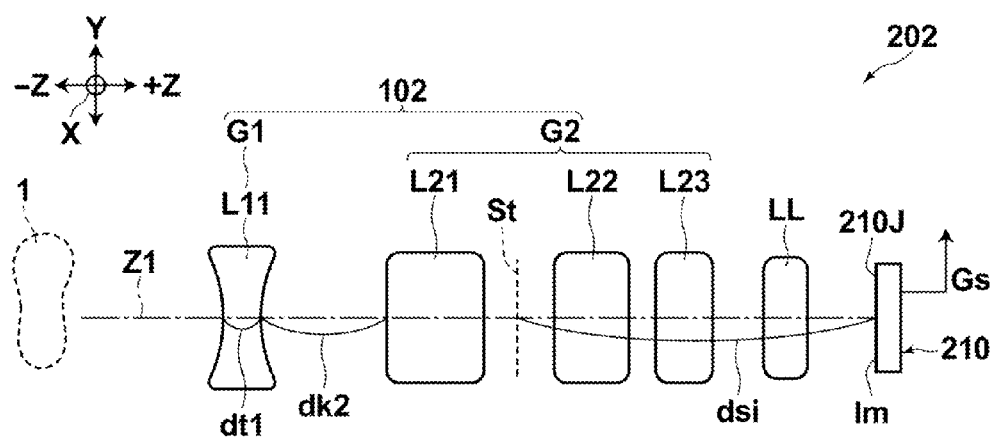

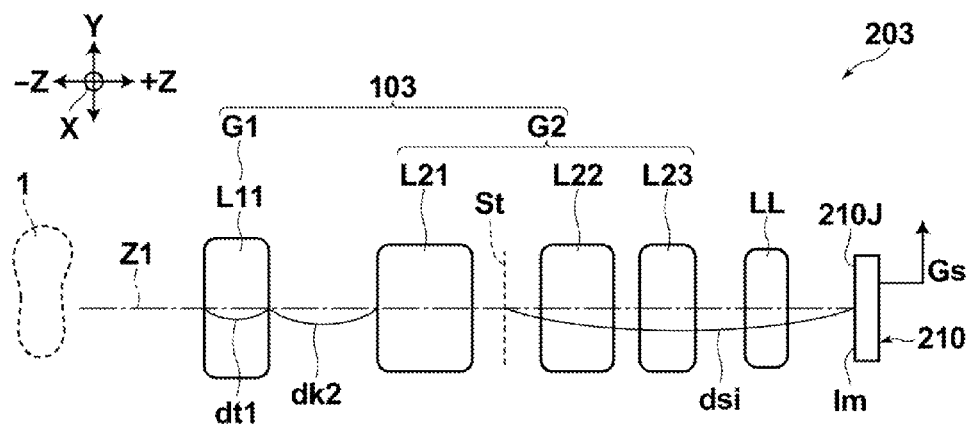
FIG.1C  THIRD EMBODIMENT
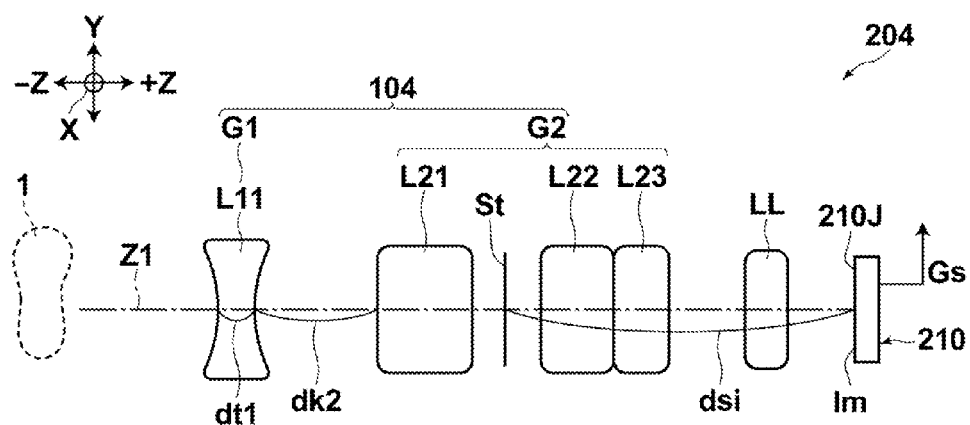
FIG.1D  FOURTH EMBODIMENT

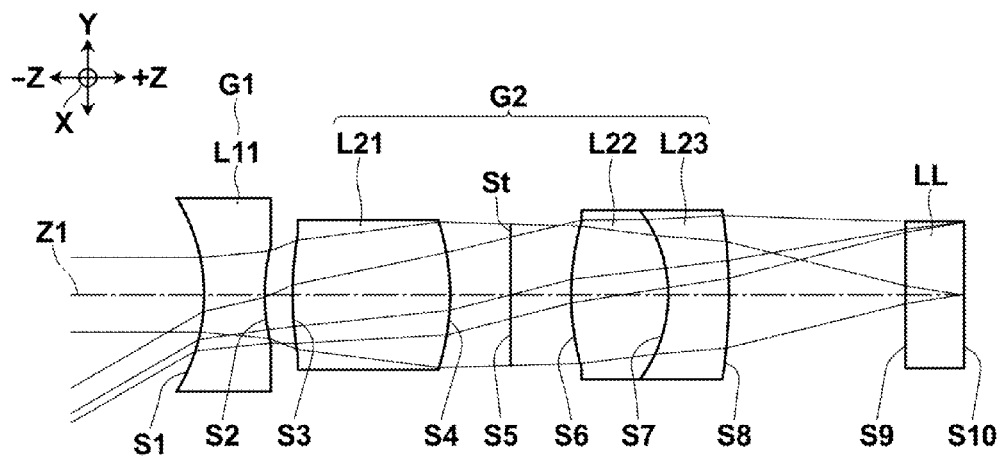
FIG.2 EXAMPLE 1
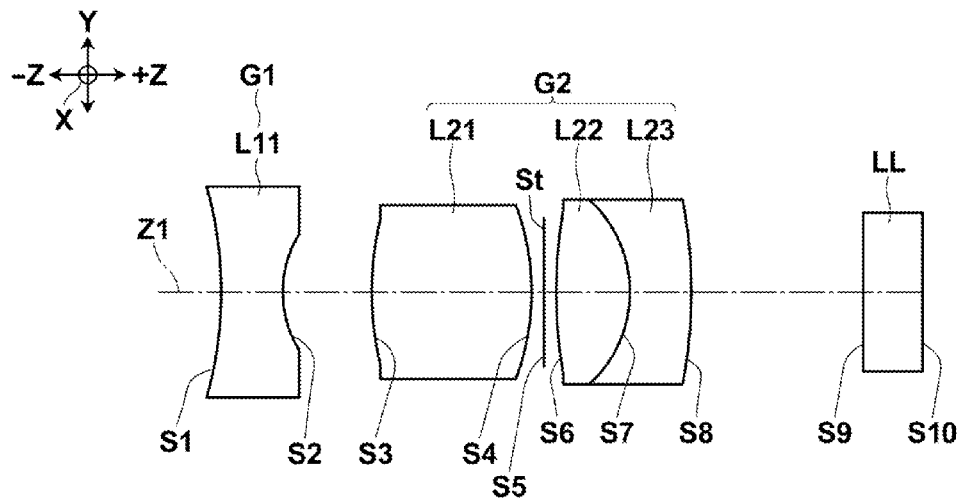
FIG.3 EXAMPLE 2

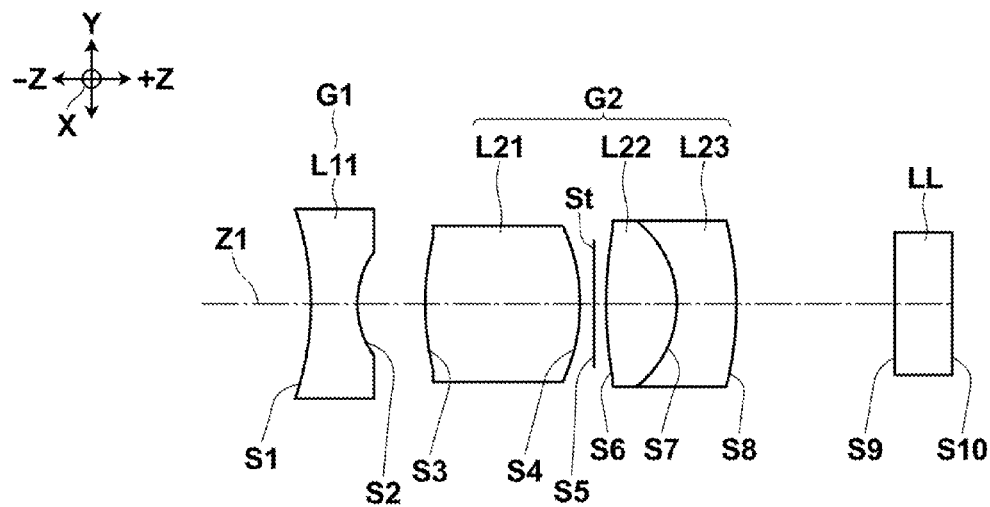
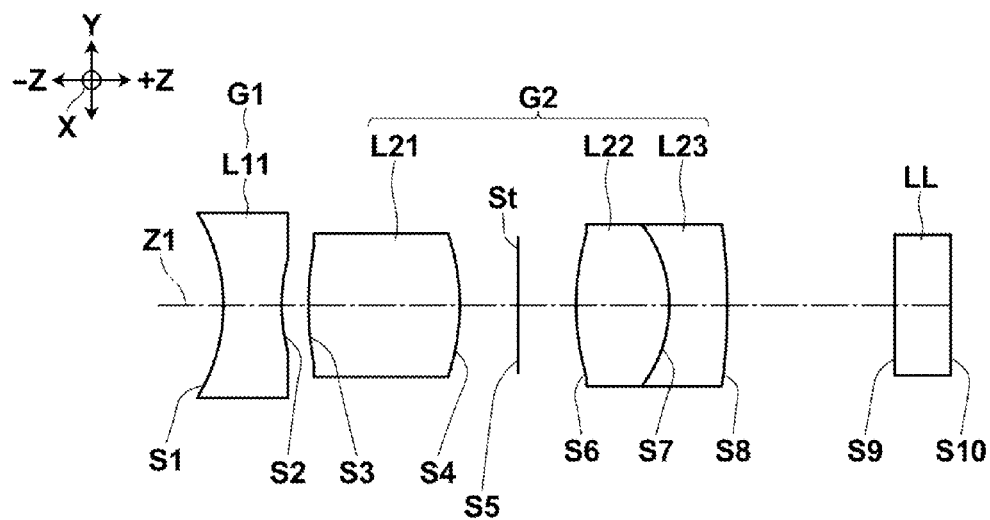

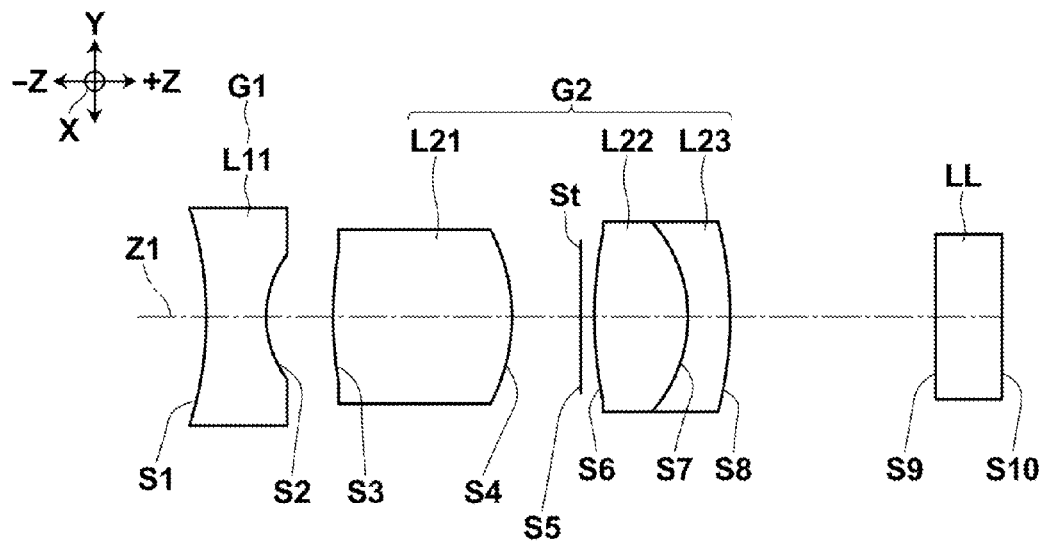
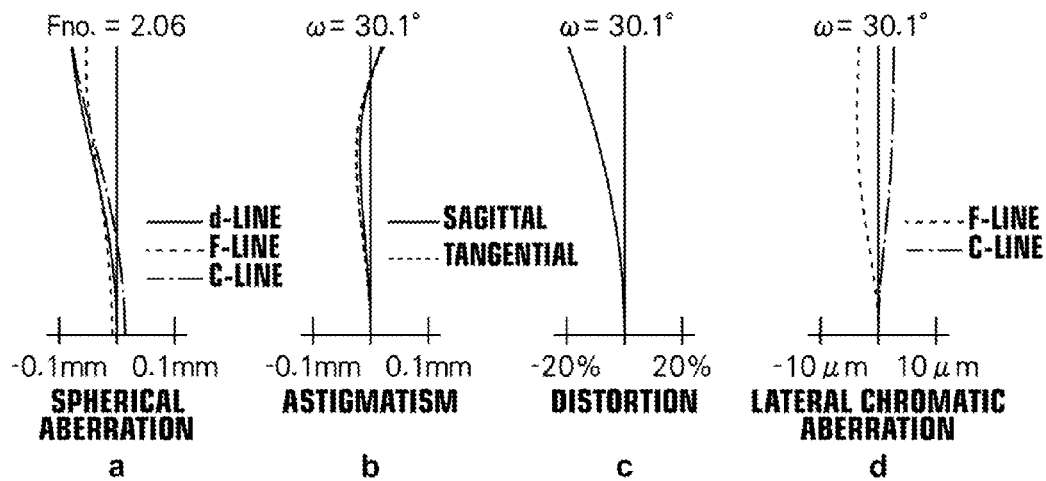

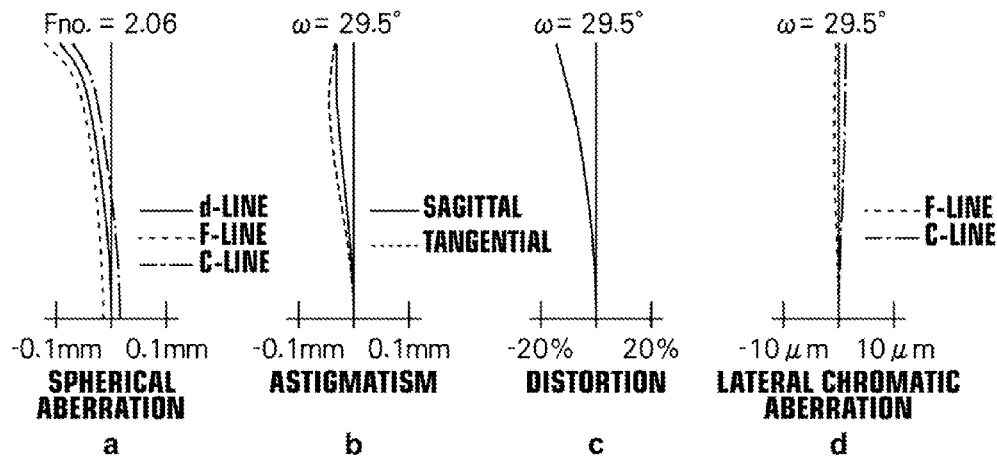
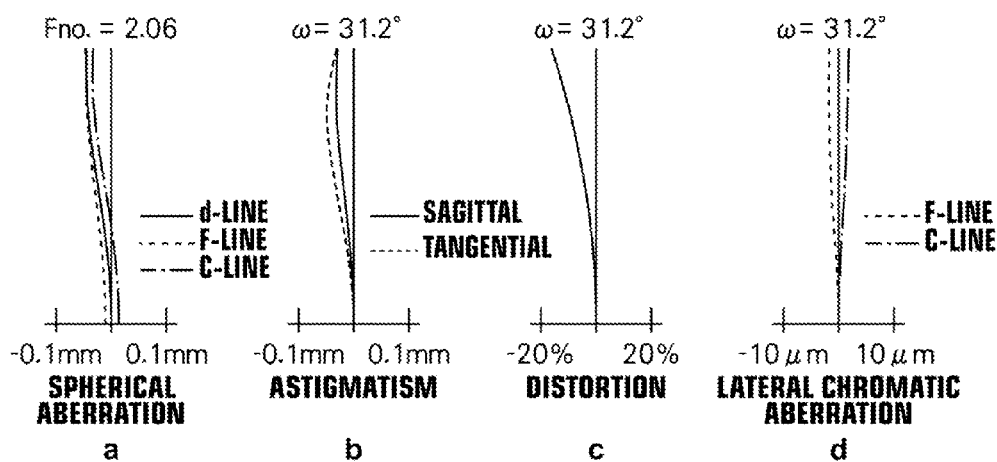

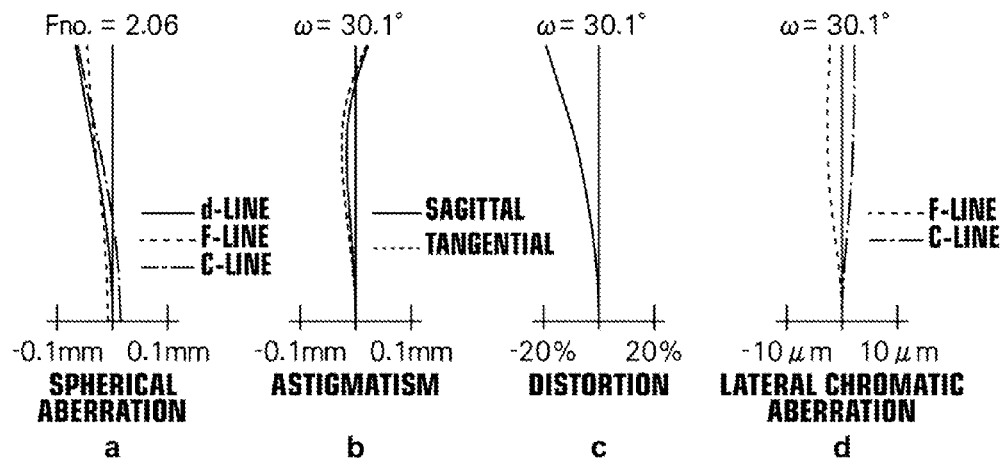
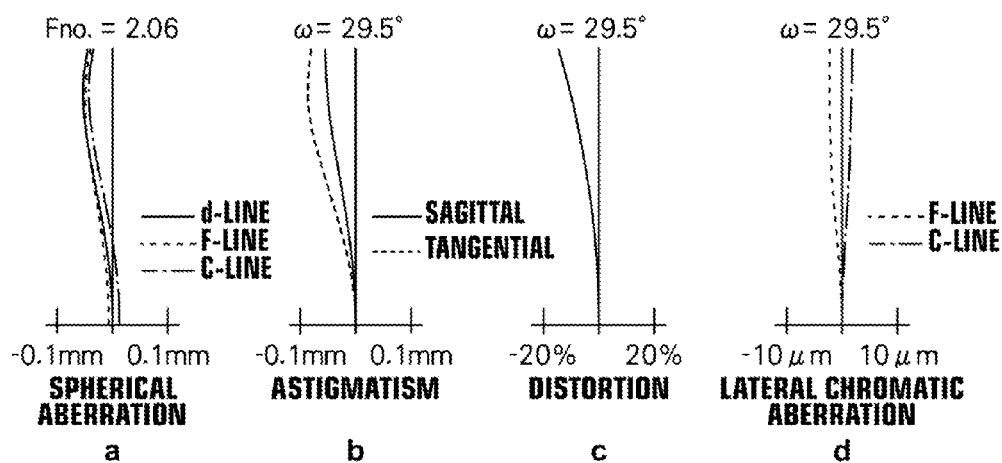

IMAGING LENS AND IMAGING APPARATUS

CROSS REFERENCE TO RELATED APPLICATIONS

This application is a continuation of Application No. PCT/JP2012/004647 filed on Jul. 23, 2012, which claims foreign priority to Japanese Application No. 2011-166422 filed on Jul. 29, 2011. The entire contents of each of the above applications are hereby incorporated by reference.

TECHNICAL FIELD

The present invention generally relates to an imaging lens and an imaging apparatus, and more specifically to an imaging lens that uses an image sensor, such as a CCD (Charge Coupled Device), a CMOS (Complementary Metal Oxide Semiconductor), or the like, and is used for surveillance cameras, mobile terminal cameras, in-vehicle cameras, and the like. The invention also relates to an imaging apparatus provided with the imaging lens.

BACKGROUND ART

Recently, as image sensors, such as CCDs, CMOSs, and the like, very small image sensors with increased pixel count have been known. Along with this, downsized imaging device bodies provided with these image sensors have also been known, and with respect to the imaging lenses for use with these imaging device bodies, those downsized while maintaining favorable optical performance are applied. In the mean time, in the applications of surveillance cameras and in-vehicle cameras, those provided with a small imaging lens yet having a wide angle of view and high performance have been known.

As imaging lenses having a wide angle of view with a relatively small number of lenses known in the aforementioned fields, those described, for example, Japanese Unexamined Patent Publication No. 9(1997)-281387, Japanese Unexamined Patent Publication No. 2(1990)-284108, Japanese Unexamined Patent Publication No. 2005-316208, and Japanese Unexamined Patent Publication No. 2011-128210 may be cited.

DISCLOSURE OF THE INVENTION

The imaging lens described in Patent Document 1, however, is dark with an F-number of 2.8 and has large chromatic aberration and astigmatism, so that the imaging lens can not be said to have so high optical performance as to be recommended for the application to such high pixel count and high performance image sensors as described above.

Also, the imaging lens described in Patent Document 2 is dark with an F-number of 3.0 and has large chromatic aberration and astigmatism, so that that the imaging lens can not be said to have so high optical performance as to be recommended for the application to such high performance image sensors as described above.

The imaging lens described in Patent Document 3 is dark with an F-number of 2.8 and has large astigmatism, although chromatic aberration is well corrected. Therefore, as in the above, it cannot be said that the imaging lens has so high optical performance as to be recommended for the application to such high performance image sensors as described above.

The imaging lens described in Patent Document 4 has tried to realize a bright lens but compactness is somewhat sacrificed for the sake of achieving the brightness and cannot be said to be sufficiently downsized.

As such, in an imaging lens with a relatively small number of lenses, e.g., four lenses, there is a demand to use a high optical performance imaging lens that satisfies both wide angle of view and compactness. More specifically, a wide angle and compact imaging lens, which is a bright optical system with an F-number of about 2.0, well corrected in aberration is anticipated.

The present invention has been developed in view of the circumstances described above, and it is an object of the present invention to provide a wide angle and compact imaging lens having high optical performance, and an imaging apparatus provided with the imaging lens.

A first imaging lens of the present invention is an imaging lens, substantially consisting of a first lens group having a negative refractive power and a second lens group having a positive refractive power, disposed in order from the object side, in which the first lens group is composed of a first group first lens which is a single lens having a negative refractive power, the second lens group is composed of a second group first lens having a positive refractive power, a second group second lens having a positive refractive power, and a second group third lens having a negative refractive power, disposed in order from the object side, and the imaging lens satisfies conditional expressions (1): $-1.1 \leq f1/f < 0$ and (2): $f1/fg2 < -0.7$ at the same time.

where: f1 is the focal length of the first group first lens at the d-line; f is the focal length of the entire lens system at the d-line; and fg2 is the combined focal length of the entire second lens group at the d-line.

The first imaging lens described above preferably satisfies a conditional expression (1a): $-1 \leq f1/f < 0$ and further preferably satisfies a conditional expression (1b): $-0.95 \leq f1/f < -0.3$. Further, the first imaging lens preferably satisfies a conditional expression (2a): $-1.1 < f1/fg2 < -0.7$ and further preferably satisfies a conditional expression (2b): $-1 < f1/fg2 < -0.7$.

A second imaging lens of the present invention is an imaging lens, substantially consisting of a first lens group having a negative refractive power and a second lens group having a positive refractive power, disposed in order from the object side, in which the first lens group is composed of a first group first lens which is a single lens having a biconcave shape and a negative refractive power, the second lens group is composed of a second group first lens having a positive refractive power, a second group second lens having a positive refractive power, and a second group third lens having a negative refractive power, disposed in order from the object side, and the imaging lens satisfies a conditional expression (3): $f1/fg2 - 1.6 \times f1/f < 0.8$.

where: f1 is the focal length of the first group first lens at the d-line; fg2 is the combined focal length of the entire second lens group at the d-line; and f is the focal length of the entire lens system at the d-line.

The second imaging lens described above preferably satisfies a conditional expression (3a): $f1/fg2 - 1.6 \times f1/f < 0.75$ and further preferably satisfies a conditional expression (3b): $f1/fg2 - 1.6 \times f1/f < 0.7$.

A third imaging lens of the present invention is an imaging lens, substantially consisting of a first lens group having a negative refractive power and a second lens group having a positive refractive power, disposed in order from the object side, in which the first lens group is composed of a first group first lens which is a single lens having a negative refractive power, the second lens group is composed of a second group first lens having a positive refractive power, a second group second lens having a positive refractive power, and a second group third lens having a negative refractive power, disposed in order from the object side, and the imaging lens satisfies conditional expressions (1): $-1.1 \leq f1/f < 0$ and (4): $0.6 < |f1/f2|$ at the same time.

where: f1 is the focal length of the first group first lens at the d-line; f2 is the focal length of the second group first lens at the d-line; and f is the focal length of the entire lens system at the d-line.

The third imaging lens described above preferably satisfies a conditional expression (1a'): $-1.1 \leq f1/f < -0.3$ and more preferably satisfies a conditional expression (1b'): $-1 \leq f1/f < -0.5$. Further, the third imaging lens described above preferably satisfies a conditional expression (4a): $0.6 < |f1/f2| < 1.1$ and further preferably satisfies a conditional expression (4b): $0.63 < |f1/f2| < 1$.

A fourth imaging lens of the present invention is an imaging lens, substantially consisting of a first lens group having a negative refractive power and a second lens group having a positive refractive power, disposed in order from the object side, in which the first lens group is composed of a first group first lens which is a single lens having a biconcave shape and a negative refractive power, the second lens group is composed of a second group first lens having a positive refractive power, an aperture stop, a second group second lens having a positive refractive power, and a second group third lens having a negative refractive power, disposed in order from the object side, the second group second lens and the second group third lens are cemented together to form a cemented lens, and the imaging lens satisfies a conditional expression (4'): $0.6 < |f1/f2| < 0.85$.

where: f1 is the focal length of the first group first lens at the d-line; and f2 is the focal length of the second group first lens at the d-line.

The fourth imaging lens described above preferably satisfies a conditional expression (4a'): $0.62 < |f1/f2| < 0.82$ and further preferably satisfies a conditional expression (4b'): $0.63 < |f1/f2| < 0.8$.

The first to the fourth imaging lenses preferably include an aperture stop in the second lens group.

Each of the first to the fourth imaging lens is preferably an imaging lens in which the second group first lens is a biconvex lens, the second group second lens is a biconvex lens, the second group third lens is a meniscus lens, and an aperture stop is disposed between the second group first lens and the second group second lens, and the second group second lens and the second group third lens are cemented together to form a cemented lens.

Each of the first to the fourth imaging lens preferably satisfies a conditional expression (5): $0.3 < dt1/f < 0.8$, more preferably satisfies a conditional expression (5a): $0.31 < dt1/f < 0.6$, and further preferably satisfies a conditional expression (5b): $0.32 < dt1/f < 0.5$.

where, dt1 is the thickness of the first group first lens on the optical axis.

Each of the first to the fourth imaging lens preferably satisfies a conditional expression (6): $0 < dk2/f < 0.7$, more preferably satisfies a conditional expression (6a): $0.1 < dk2/f < 0.65$, and further preferably satisfies a conditional expression (6b): $0.15 < dk2/f < 0.62$.

where, dk2 is the distance (air equivalent distance) between the first group first lens and the second group first lens on the optical axis. If no optical member is disposed between the first group first lens and the second group first lens, the distance simply becomes air distance.

Each of the first to the fourth imaging lens preferably satisfies a conditional expression (7): $0 < fg2/f < 1.3$, more preferably satisfies a conditional expression (7a): $0.3 < fg2/f < 1.28$, and further preferably satisfies a conditional expression (7b): $0.5 < fg2/f < 1.25$, where fg2 is the combined focal length of the entire second lens group at the d-line.

Each of the first to the fourth imaging lens preferably satisfies a conditional expression (8): $38 < vd1 < 70$, more preferably satisfies a conditional expression (8a): $40 < vd1 < 68$, and further preferably satisfies a conditional expression (8b): $41 < vd1 < 66$.

where vd1 is the Abbe number of the first group first lens with reference to the d-line.

Each of the first to the fourth imaging lens preferably satisfies a conditional expression (9): $35 < vd2 < 70$, more preferably satisfies a conditional expression (9a): $38 < vd2 < 68$, and further preferably satisfies a conditional expression (9b): $40 < vd2 < 66$.

where, vd2 is the Abbe number of the second group first lens with reference to the d-line.

In a case where an aperture stop is provided, each of the first to the fourth imaging lens preferably satisfies a conditional expression (10): $13.5 < dsi < 22$, more preferably satisfies a conditional expression (10a): $13.8 < dsi < 20$, and further preferably satisfies a conditional expression (10b): $14 < dsi < 18$.

where, dsi is the distance between the aperture stop and the image plane on the optical axis (the back focus portion is expressed in terms of air equivalent distance). That is, the "distance between the aperture stop and the image plane on the optical axis" is the distance between the apex of the image side surface of the second group third lens to the image plane (back focus) expressed in term of air equivalent distance (air equivalent distance is applied to the thickness of an optical element having no refractive power disposed between the aforementioned apex and the image plane). Note that actual length is used for the distance between the aperture stop and the apex of the image side surface of the second group third lens.

An imaging apparatus of the present invention is an apparatus, including any of the first to the fourth imaging lenses.

In each of the first to the fourth imaging lenses described above, the second group first lens constituting the second lens group is a single lens.

Each of the first to the fourth imaging lenses described above includes no optical element having a power between the first lens group and the second lens group. That is, each of the first to the fourth imaging lenses is configured not to include an optical member having a refractive power between the first lens group and the second lens group.

The term "an imaging lens substantially consisting of n lens groups" as used herein refers to an imaging lens provided with a lens having substantially no refractive power, an optical element other than a lens, such as an aperture stop, a cover glass, or the like, a lens flange, a lens barrel, an image sensor, a mechanical component, such as a camera shake correction mechanism, and the like, in addition to the n lens groups.

Each of the first to the fourth imaging lenses may include a lens group having a refractive power disposed on the image side of the second lens group.

According to the first imaging lens and imaging apparatus provided with the same, a first lens group having a negative refractive power and a second lens group having a positive refractive power are provided in order from the object side, in which the first lens group is composed of a first group first lens which is a single lens having a negative refractive power, the second lens group is composed of a second group first lens having a positive refractive power, a second group second lens having a positive refractive power, and a second group third lens having a negative refractive power disposed in order from the object side, and the imaging lens is configured to satisfy the conditional expressions (1): $-1.1 \leq f1/f < 0$ and (2): $f1/fg2 < -0.7$ at the same time. This allows the first imaging lens and imaging apparatus provided with the same to be compact with a wide angle of view and high optical performance. For example, the first imaging lens may be a wide angle and compact imaging lens well corrected in aberration and bright with an F-number of about 2.0.

According to the second imaging lens and imaging apparatus provided with the same, a first lens group having a negative refractive power and a second lens group having a positive refractive power are provided in order from the object side, in which the first lens group is composed of a first group first lens which is a single lens having a biconcave shape and a negative refractive power, the second lens group is composed of a second group first lens having a positive refractive power, a second group second lens having a positive refractive power, and a second group third lens having a negative refractive power, disposed in order from the object side, and the imaging lens is configured to satisfy the conditional expression (3): $f1/fg2 - 1.6 \times f1/f < 0.8$. This allows the second imaging lens and imaging apparatus provided with the same to be compact with a wide angle of view and high optical performance. For example, the second imaging lens may be a wide angle and compact imaging lens well corrected in aberration and bright with an F-number of about 2.0.

According to the third imaging lens and imaging apparatus provided with the same, a first lens group having a negative refractive power and a second lens group having a positive refractive power are provided in order from the object side, in which the first lens group is composed of a first group first lens which is a single lens having a negative refractive power, the second lens group is composed of a second group first lens having a positive refractive power, a second group second lens having a positive refractive power, and a second group third lens having a negative refractive power, disposed in order from the object side, and the imaging lens is configured to satisfy the conditional expressions (1): $-1.1 \leq f1/f < 0$ and (4): $0.6 < |f1/f2|$ at the same time. This allows the third imaging lens and imaging apparatus provided with the same to be compact with a wide angle of view and high optical performance. For example, the third imaging lens may be a wide angle and compact imaging lens well corrected in aberration and bright with an F-number of about 2.0.

According to the fourth imaging lens and imaging apparatus provided with the same, a first lens group having a negative refractive power and a second lens group having a positive refractive power are provided in order from the object side, in which the first lens group is composed of a first group first lens which is a single lens having a biconcave shape and a negative refractive power, the second lens group is composed of a second group first lens having a positive refractive power, an aperture stop, a second group second lens having a positive refractive power, and a second group third lens having a negative refractive power, disposed in order from the object side, the second group second lens and the second group third lens are cemented together to form a cemented lens, and the imaging lens is configured to satisfy the conditional expression (4'): $0.6 < |f1/f2| < 0.85$. This allows the fourth imaging lens and imaging apparatus provided with the same to be compact with a wide angle of view and high optical performance. For example, the fourth imaging lens may be a wide angle and compact imaging lens well corrected in aberration and bright with an F-number of about 2.0.

BRIEF DESCRIPTION OF DRAWINGS

FIG. 1A is a cross-sectional view of an imaging lens and imaging apparatus of a first embodiment of the present invention.

FIG. 1B is a cross-sectional view of an imaging lens and imaging apparatus of a second embodiment of the present invention.

FIG. 1C is a cross-sectional view of an imaging lens and imaging apparatus of a third embodiment of the present invention.

FIG. 1D is a cross-sectional view of an imaging lens and imaging apparatus of a fourth embodiment of the present invention.

FIG. 2 illustrates a configuration of an imaging lens according to Example 1 with optical paths.

FIG. 3 illustrates a configuration of an imaging lens according to Example 2.

FIG. 4 illustrates a configuration of an imaging lens according to Example 3.

FIG. 5 illustrates a configuration of an imaging lens according to Example 4.

FIG. 6 illustrates a configuration of an imaging lens according to Example 5.

FIG. 7 shows in a to d aberration diagrams of the imaging lens according to Example 1.

FIG. 8 shows in a to d aberration diagrams of the imaging lens according to Example 2.

FIG. 9 shows in a to d aberration diagrams of the imaging lens according to Example 3.

FIG. 10 shows in a to d aberration diagrams of the imaging lens according to Example 4.

FIG. 11 shows in a to d aberration diagrams of the imaging lens according to Example 5.

BEST MODE FOR CARRYING OUT THE INVENTION

Figure 12:
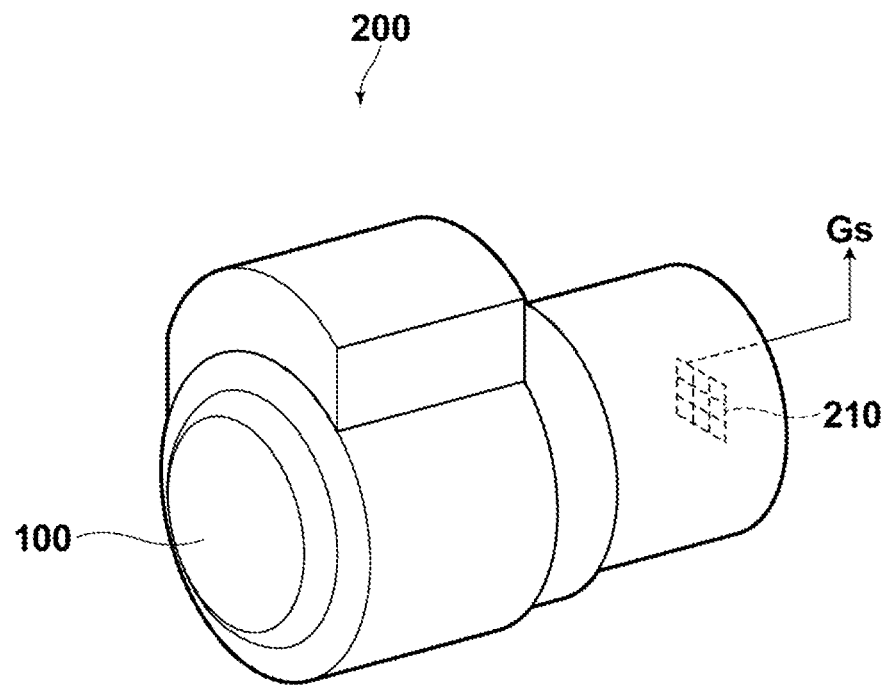
FIG. 12 illustrates a surveillance camera provided with the imaging lens of the present invention.

Hereinafter, embodiments of the present invention will be described with reference to the accompanying drawings.

FIG. 1A is a cross-sectional view of an imaging lens and imaging apparatus according to a first embodiment of the present invention, illustrating the configuration thereof, FIG. 1B is a cross-sectional view of an imaging lens and imaging apparatus according to a second embodiment of the present invention, illustrating the configuration thereof, FIG. 1C is a cross-sectional view of an imaging lens and imaging apparatus according to a third embodiment of the present invention, illustrating the configuration thereof, and FIG. 1D is a cross-sectional view of an imaging lens and imaging apparatus according to a fourth embodiment of the present invention, illustrating the configuration thereof.

As illustrated in FIG. 1A, an imaging apparatus 201 according to the first embodiment of the present invention includes an image sensor 210 and an imaging lens 101 according to the first embodiment of the present invention. The image sensor 210 converts an optical image Im representing a subject 1 formed on a light receiving surface 210J of the image sensor 210 through the imaging lens 101 to an electrical signal and generates an image signal Gs representing the subject 1. As for the image sensor 210, for example, a CCD image sensor, a CMOS image sensor, a MOS image sensor, or the like may be employed.

The imaging lens 101 includes a first lens group G1 having a negative refractive power and a second lens group G2 having a positive refractive power arranged in order from the object side (arrow −Z direction side in the drawing). Note that no optical member having a power is disposed between the first lens group G1 and the second lens group G2.

The first lens group G1 includes only one lens of a first group first lens L11 which is a single lens having a negative refractive power, as optical member having a power.

The second lens group G2 includes a second group first lens L21 which is a single lens having a positive refractive power, a second group second lens L22 having a positive refractive power, and a second group third lens L23 having a negative refractive power arranged in order from the object side, as optical member having a power.

Further, the imaging lens 101 satisfies a conditional expression (1): $-1.1 \leq f1/f < 0$ and a conditional expression (2): $f1/fg2 < -0.7$ at the same time, where f1 is the focal length of the first group first lens L11, f is the focal length of the entire lens system, and fg2 is the combined focal length of the entire second lens group.

The imaging lens 101 more preferably satisfies a conditional expression (1a): $-1 \leq f1/f < 0$ and further preferably satisfies a conditional expression (1b): $-0.95 \leq f1/f < -0.3$. Further, the imaging lens 101 more preferably satisfies a conditional expression (2a): $-1.1 < f1/fg2 < -0.7$ and further preferably satisfies a conditional expression (2b): $-1 < f1/fg2 < -0.7$.

As illustrated in FIG. 1B, an imaging apparatus 202 according to the second embodiment of the present invention includes an image sensor 210 and an imaging lens 102 according to the second embodiment of the present invention. The structure and operation of the image sensor 210 are identical to those in the imaging apparatus 201 described above.

The imaging lens 102 includes a first lens group G1 having a negative refractive power and a second lens group G2 having a positive refractive power arranged in order from the object side (arrow −Z direction side in the drawing). Note that no optical member having a power is disposed between the first lens group G1 and the second lens group G2.

The first lens group G1 includes only one lens of a first group first lens L11 which is a biconcave single lens having a negative refractive power, as optical member having a power.

The second lens group G2 includes a second group first lens L21 which is a single lens having a positive refractive power, a second group second lens L22 having a positive refractive power, and a second group third lens L23 having a negative refractive power arranged in order from the object side, as optical member having a power.

Further, the imaging lens 102 satisfies a conditional expression (3): $f1/fg2 - 1.6 \times f1/f < 0.8$, where f1 is the focal length of the first group first lens L11, fg2 is the combined focal length of the entire second lens group G2, and f is the focal length of the entire lens system.

The imaging lens 102 more preferably satisfies a conditional expression (3a): $f1/fg2 - 1.6 \times f1/f < 0.75$ and further preferably satisfies a conditional expression (3b): $f1/fg2 - 1.6 \times f1/f < 0.7$.

As illustrated in FIG. 1C, an imaging apparatus 203 according to the third embodiment of the present invention includes an image sensor 210 and an imaging lens 103 according to the third embodiment of the present invention. The structure and operation of the image sensor 210 are identical to those in the imaging apparatus 201 described above.

The imaging lens 103 includes a first lens group G1 having a negative refractive power and a second lens group G2 having a positive refractive power arranged in order from the object side (arrow −Z direction side in the drawing). Note that no optical member having a power is disposed between the first lens group G1 and the second lens group G2.

The first lens group G1 includes only one lens of a first group first lens L11 which is a single lens having a negative refractive power, as optical member having a power.

The second lens group G2 includes a second group first lens L21 which is a single lens having a positive refractive power, a second group second lens L22 having a positive refractive power, and a second group third lens L23 having a negative refractive power arranged in order from the object side, as optical member having a power.

Further, the imaging lens 103 satisfies a conditional expression (1): $-1.1 \leq f1/f < 0$ and a conditional expression (4): $0.6 < |f1/f2|$ at the same time, where f1 is the focal length of the first group first lens L11, f is the focal length of the entire lens system, and f2 is the focal length of the second group first lens L21.

The imaging lens 103 more preferably satisfies a conditional expression (1a'): $-1.1 \leq f1/f < -0.3$ and further preferably satisfies a conditional expression (1b'): $-1 \leq f1/f < -0.5$. Further, the imaging lens 103 more preferably satisfies a conditional expression (4a): $0.6 < |f1/f2| < 1.10$ and further preferably satisfies a conditional expression (4b): $0.63 < |f1/f2| < 1$.

As illustrated in FIG. 1D, an imaging apparatus 204 according to the third embodiment of the present invention includes an image sensor 210 and an imaging lens 104 according to the third embodiment of the present invention. The structure and operation of the image sensor 210 are identical to those in the imaging apparatus 201 described above.

The imaging lens 104 includes a first lens group G1 having a negative refractive power and a second lens group G2 having a positive refractive power arranged in order from the object side (arrow −Z direction side in the drawing). Note that no optical member having a power is disposed between the first lens group G1 and the second lens group G2.

The first lens group G1 includes only one lens of a first group first lens L11 which is a biconcave single lens having a negative refractive power, as optical member having a power.

The second lens group G2 includes a second group first lens L21 which is a single lens having a positive refractive power, and a cemented lens formed of a second group second lens L22 having a positive refractive power and a second group third lens L23 having a negative refractive power arranged in order from the object side, as optical member having a power. Note that the second group second lens L22 and the second group third lens L23 are disposed in this order from the object side.

An aperture stop St is disposed between the second group first lens L21 and the second group second lens L22.

Further, the imaging lens 104 satisfies a conditional expression (4'): $0.6 < |f1/f2| < 0.85$, where f1 is the focal length of the first group first lens L11 and f2 is the focal length of the second group first lens L21.

The imaging lens 104 more preferably satisfies a conditional expression (4a'): $0.62 < |f1/f2| < 0.82$ and further preferably satisfies a conditional expression (4b'): $0.63 < |f1/f2| < 0.8$.

Each of the imaging lens 101 of the first embodiment, the imaging lens 102 of the second embodiment, the imaging lens 103 of the third embodiment, and the imaging lens 104 of the fourth embodiment may also have the following configurations.

Each of the imaging lenses 101, 102, 103 may include an aperture stop disposed in the second lens group G2 and, for example, the aperture stop St may be disposed between the second group first lens L21 and the second group second lens L22, as illustrated in FIGS. 1A, 1B, 1C. Note that, for the imaging lens 104, the configuration in which the aperture stop St is disposed between the second group first lens L21 and the second group second lens L22, as illustrated in FIG. 1D, is essential.

Each of the imaging lens 101, 102, 103, 104 may have a configuration in which the second group first lens L21 is a biconvex lens, the second group second lens L22 is a biconvex lens, the second group third lens L23 is a meniscus lens, an aperture stop is disposed between the second group first lens L21 and the second group second lens L22, and the second group second lens L22 and the second group third lens L23 are cemented together to form a cemented lens.

Each imaging lens described above preferably satisfies a conditional expression (5): $0.3 < dt1/f < 0.8$, more preferably satisfies a conditional expression (5a): $0.31 < dt1/f < 0.6$, and further preferably satisfies a conditional expression (5b): $0.32 < dt1/f < 0.5$, where dt1 is the thickness of the first group first lens L11 on the optical axis.

Further, each imaging lens described above preferably satisfies a conditional expression (6): $0 < dk2/f < 0.7$, more preferably satisfies a conditional expression (6a): $0.1 < dk2/f < 0.65$, and further preferably satisfies a conditional expression (6b): $0.15 < dk2/f < 0.62$, where dk2 is the distance (air equivalent distance) between the first group first lens L11 and the second group first lens L21 on the optical axis.

Still further each imaging lens described above preferably satisfies a conditional expression (7): $0 < fg2/f < 1.3$, more preferably satisfies a conditional expression (7a): $0.3 < fg2/f < 1.28$, and further preferably satisfies a conditional expression (7b): $0.5 < fg2/f < 1.25$, where fg2 is the combined focal length of the second lens group G2 (combined focal length of the entire second lens group G2).

Further, each imaging lens described above preferably satisfies a conditional expression (8): $38 < vd1 < 70$, more preferably satisfies a conditional expression (8a): $40 < vd1 < 68$, and further preferably satisfies a conditional expression (8b): $41 < vd2 < 66$, where vd1 is the Abbe number of the first group first lens L11 with reference to the d-line.

Still further, each imaging lens described above preferably satisfies a conditional expression (9): $35 < vd2 < 70$, more preferably satisfies a conditional expression (9a): $38 < vd2 < 68$, and further preferably satisfies a conditional expression (9b): $40 < vd2 < 66$, where vd2 is the Abbe number of the second group first lens L21 with reference to the d-line.

Further, each imaging lens described above preferably satisfies a conditional expression (10): $13.5 < dsi < 22$, more preferably satisfies a conditional expression (10a): $13.8 < dsi < 20$, and further preferably satisfies a conditional expression (10b): $14 < dsi < 18$, where dsi is the distance between the aperture stop St and the image plane Im on the optical axis (the back focus portion is expressed in terms of air equivalent distance). That is, the "distance between the aperture stop St and the image plane Im on the optical axis" is the distance between the apex of the image side surface of the second group third lens L23 and the image plane Im (back focus) expressed in terms of air equivalent distance by applying an air equivalent distance to the thickness of the optical element LL, such as a cover glass or the like.

The effects of the conditional expressions (1), (2), (3), (4), (5), (6), (7), (8), (9), (10) will now be described collectively.

[Effects of Conditional Expression (1): $-1.1 \leq f1/f < 0$]

The conditional expression (1) defines the range of the ratio of the "focal length f1 of the first lens group G1 (first group first lens L11)" to the "focal length f of the entire lens system".

By configuring the imaging lens to satisfy the conditional expression (1), the balance between spherical aberration and image plane aberration may be maintained in a favorable condition while achieving downsizing.

If the imaging lens is configured to exceed the upper limit of the conditional expression (1), the negative refractive power of the first lens group G1 (first group first lens L11) is increased and spherical aberration is increased, whereby the difference between the "spherical aberration of the marginal rays" and the "spherical aberration of the rays passing through the ray height corresponding to 70% of that of the marginal rays" is increased. Further, the peripheral sagittal image surface is inclined to the over side.

If the imaging lens is configured to fall below the lower limit of the conditional expression (1), the negative refractive power of the first lens group G1 is reduced and the image plane is inclined to the under side. Further, the need to extend the overall lens length is increased for aberration correction so that downsizing becomes difficult.

The effects of the conditional expressions (1a), (1b) are identical to those of the conditional expression (1).

[Effects of Conditional Expression (2): $f1/fg2 < -0.7$]

The conditional expression (2) defines the range of the ratio of the "focal length f1 of the first lens group G1 (first group first lens L11)" to the "combined focal length fg2 of the entire second lens group G2".

By configuring the imaging lens to satisfy the conditional expression (1), the balance between spherical aberration and image plane aberration may be maintained in a favorable condition while achieving downsizing.

If the imaging lens is configured to exceed the upper limit of the conditional expression (2), the back focus becomes long and the tangential image plane further tends to be inclined to the under side.

By configuring the imaging lens to satisfy the conditional expression (2a): $-1.1 < f1/fg2 < -0.7$ or the conditional expression (2b): $-1 < f1/fg2 < -0.7$, the balance between spherical aberration and image plane aberration may be maintained in a favorable condition while achieving downsizing.

If the imaging lens exceeds the upper limit of the conditional expression (2a) or the conditional expression (2b), the back focus becomes long and the tangential image plane further tends to be inclined to the under side.

If the imaging lens falls below the lower limit of the conditional expression (2a) or the conditional expression (2b), the effective diameter of the front lens needs to be increased by extending the overall lens length in order to prevent aberrations. On the other hand, if the overall lens length is tried not to be increased, the tangential image surface is inclined to the "under" side.

[Effects of Conditional Expression (3): $f1/fg2 - 1.6 \times f1/f < 0.8$]

The conditional expression (3) defines the value range of the difference between the "ratio of the focal length f1 of the first lens group G1 (first group first lens L11) to the combined focal length fg2 of the entire second lens group G2" and the "ratio of the focal length f1 of the first lens group G1 (first group first lens L11) to the focal length f of the entire lens system".

By configuring the imaging lens to satisfy the conditional expression (3), the balance between spherical aberration and image plane aberration may be maintained in a favorable condition while achieving downsizing.

If the imaging lens exceeds the upper limit of the conditional expression (3), the tangential image plane is inclined to the "under" side, and the need to extend the overall lens length is increased for aberration correction, so that downsizing becomes difficult If the imaging lens falls below the lower limit of the conditional expression (3), it is difficult to make the imaging lens bright by increasing the aperture as spherical aberration increases, although the overall lens length may be reduced.

The effects of the conditional expressions (3a), (3b) are identical to those of the conditional expression (3).

[Effects of Conditional Expression (4): 0.6<|f1/f2|]

The conditional expression (4) defines the range of the ratio of the "focal length f1 of the first lens group G1 (first group first lens L11)" to the "focal length f2 of the second group first lens L21 having a positive refractive power and is disposed on the most object side in the second lens group G2".

By configuring the imaging lens to satisfy the conditional expression (4), the light passing through and diffused by the first lens group G1 having a negative power may be converged appropriately through the second group first lens L21, so that the imaging lens may further be downsized.

If the imaging lens falls below the lower limit of the conditional expression (4), the focal length f2 of the second group first lens L21 is increased and the distance between the first lens group G1 and the second lens group G2 is increased, thereby resulting in that the overall lens length further tends to be extended and downsizing becomes difficult.

By configuring the imaging lens to satisfy the conditional expression (4a): 0.6<|f1/f2|<1.1 or the conditional expression (4b): 0.63<|f1/f2|<1, the light passing through and diffused by the first lens group G1 having a negative power may be converged appropriately through the second group first lens L21, so that the imaging lens may further be downsized.

If the imaging lens exceeds the upper limit of the conditional expression (4a) or (4b), the positive refractive power of the second group first lens L21 becomes strong in comparison with the negative power of the first lens group G1, thereby causing a problem that the image plane is inclined to the "under" side.

If the imaging lens falls below the lower limit of the conditional expression (4a) or (4b), the focal length f2 of the second group first lens L21 is increased and the distance between the first lens group G1 and the second lens group G2 is increased, thereby resulting in that the overall lens length further tends to be extended and downsizing becomes difficult.

[Effects of Conditional Expression (4'): 0.6<|f1/f2|0.85]

The conditional expression (4') defines the range of the ratio of the "focal length f1 of the first lens group G1 (first group first lens L11)" to the "focal length f2 of the second group first lens L21 having a positive refractive power and is disposed on the most object side in the second lens group G2".

By configuring the imaging lens to satisfy the conditional expression (4'), the light passing through and diffused by the first lens group G1 having a negative power may be converged appropriately through the second group first lens L21, so that the imaging lens may further be downsized.

If the imaging lens falls below the lower limit of the conditional expression (4'), the focal length f2 of the second group first lens L21 is increased and the distance between the first lens group G1 and the second lens group G2 is increased, thereby resulting in that the overall lens length further tends to be extended and downsizing becomes difficult.

If the imaging lens exceeds the upper limit of the conditional expression (4'), the positive refractive power of the second group first lens L21 becomes strong in comparison with the negative power of the first lens group G1, thereby causing a problem that the image plane is inclined to the "under" side.

The effects of the conditional expressions (4a'), (4b') are identical to those of the conditional expression (4').

[Effects of Conditional Expression (5): 0.3<dt1/f<0.8]

The conditional expression (5) defines the range of the ratio of the "thickness dt1 of the first group first lens L11 disposed on the most object side" to the "focal length f of the entire lens system".

By configuring the imaging lens to satisfy the conditional expression (5), the overall lens length and the diameter of the imaging lens may be reduced, whereby downsizing may be achieved.

If the imaging lens exceeds the upper limit of the conditional expression (5), the variation in the spherical aberration to the change in the angle of view is increased. Further, the need to extend the overall lens length for aberration correction is increased, so that downsizing becomes difficult.

If the imaging lens falls below the lower limit of the conditional expression (5), spherical aberration further tends to be increased, although it is convenient for downsizing the imaging lens.

The effects of the conditional expressions (5a), (5b) are identical to those of the conditional expression (5).

[Effects of Conditional Expression (6): 0<dk2/f<0.7]

The conditional expression (6) defines the range of the ratio of the "distance dk2 (air equivalent distance) between the first lens group G1 and the second lens group G2" to the "focal length f of the entire lens system".

By configuring the imaging lens to satisfy the conditional expression (6), the balance between spherical aberration and image plane aberration may be maintained in a favorable condition while achieving downsizing.

If the imaging lens exceeds the upper limit of the conditional expression (6), the need to extend the overall lens length is increased for aberration correction and downsizing becomes difficult.

If the imaging lens falls below the lower limit of the conditional expression (6), problems arise that spherical aberration further tends to be increased and the tangential image plane is inclined to the over side, although it is convenient for downsizing.

The effects of the conditional expressions (6a), (6b) are identical to those of the conditional expression (6).

[Effects of Conditional Expression (7): 0<fg2/f<1.3]

The conditional expression (7) defines the range of the ratio of the "combined focal length fg2 of the entire second lens group G2" to the "focal length f of the entire lens system".

By configuring the imaging lens to satisfy the conditional expression (7), the balance between spherical aberration and image plane aberration may be maintained in a favorable condition while achieving downsizing of the imaging lens.

If the imaging lens exceeds the upper limit of the conditional expression (7), the balance in refractive power between the first lens group G1 and the subsequent group is disrupted, whereby the tangential image plane is inclined to the under side.

If the imaging lens falls below the lower limit of the conditional expression (7), the focal lengths of the first lens group G1 and the subsequent group are both reduced and the refractive powers are increased, so that high order spherical aberration is likely to occur.

The effects of the conditional expressions (7a), (7b) are identical to those of the conditional expression (7).

[Effects of Conditional Expression (8): 38<vd1<70]

The conditional expression (8) defines the range of the Abbe number of the first group first lens L11 disposed on the most object side.

By configuring the imaging lens to satisfy the conditional expression (8), chromatic aberration may be inhibited.

If the imaging lens exceeds the upper limit of the conditional expression (8), longitudinal chromatic aberration further tends to be under-corrected and lateral chromatic aberration further tends to be over-corrected in the short wavelength side.

If the imaging lens falls below the lower limit of the conditional expression (3), longitudinal chromatic aberration further tends to be over-corrected and lateral chromatic aberration further tends to be under-corrected in the short wavelength side.

The effects of the conditional expressions (8a), (8b) are identical to those of the conditional expression (8).

[Effects of Conditional Expression (9): $35<vd2<70$]

The conditional expression (9) defines the range of the Abbe number of the second group first lens L21 disposed on the most object side in the second lens group.

By configuring the imaging lens to satisfy the conditional expression (9), chromatic aberration that occurs when diffused light is converged may be inhibited.

If the imaging lens exceeds the upper limit of the conditional expression (9), longitudinal chromatic aberration further tends to be over-corrected in the short wavelength side.

If the imaging lens falls below the lower limit of the conditional expression (6), longitudinal chromatic aberration further tends to be under-corrected in the short wavelength side.

The effects of the conditional expressions (9a), (9b) are identical to those of the conditional expression (9).

[Effects of Conditional Expression (10): $13.5<dsi<22$]

The conditional expression (10) defines the range of the aforementioned "distance between the aperture stop St and the image plane Im on the optical axis (the back focus portion is expressed in terms of air equivalent distance)".

By configuring the imaging lens to satisfy the conditional expression (10), the overall lens length and the diameter of the imaging lens may be reduced, whereby downsizing may be achieved.

If the imaging lens exceeds the upper limit of the conditional expression (10), the need to extend the overall lens length for aberration correction is increased and downsizing becomes difficult. Problems arise that the overall lens length needs to be extended in order to obtain desired lens performance and lateral chromatic aberration is under corrected with respect to the light in the short wavelength side.

On the other hand, if the imaging lens falls below the lower limit of the conditional expression (10), spherical aberration is increased and the difference between the "spherical aberration of the marginal rays" and the "spherical aberration of the rays passing through the ray height corresponding to 70% of that of the marginal rays" is increased.

The effects of the conditional expressions (10a), (10b) are identical to those of the conditional expression (10).

When applying each imaging lens described above to an imaging apparatus, optical elements LL having substantially no refractive power, such as a cover glass, a low-pass filter, an infrared cut filter, and the like may be disposed between each of the imaging lenses 101 to 104 and the image sensor 210 according to the structure of the imaging apparatus. For example, if each of the imaging lenses 101 to 104 is mounted on an in-vehicle camera and the camera is used as a night surveillance camera, it is preferable that a filter that cuts light having wavelengths ranging from the ultraviolet to the blue light is inserted between the imaging lens and the image sensor.

Instead of disposing a low-pass filter and various types of filters that cut specific wavelength regions between each of the imaging lenses 101 to 104 and the image sensor 210, various types of filters may be disposed between the lenses constituting the image lens or thin films having identical effects to those of the various types of filters may also be formed (applying coatings) on the lens surfaces constituting the imaging lens.

If each of the imaging lenses 101 to 104 is used, for example, for outdoor surveillance, the imaging lens is required to be usable in a wide temperature range from the open air in a cold region to the interior of a car in summer in a tropical region. In such a case, it is preferable that the material of all of the lenses constituting each imaging lens is glass. Further, all of the lenses constituting each imaging lens are preferably spherical lenses in order to manufacture the lenses inexpensively. In a case where a priority is given to the optical performance over the cost, however, an aspherical lens may be employed.

As described above, the imaging lenses of the first to fourth embodiments of the present invention have high optical performance and may realize a wide angle of view and downsizing.

EXAMPLES

Examples that illustrate specific numerical data of the imaging lenses according to the present invention will now be described.

Numerical data and the like of each of Examples 1 to 5 of the present invention will be described collectively with reference to FIGS. 2 to 6, FIGS. 7 to 11, and Tables 1 to 6. In FIGS. 2 to 6, reference symbols corresponding to those in FIGS. 1A, 1B, 1C, and 1D representing the imaging lenses 101, 102, 103, and 104 respectively indicate corresponding components.

Example 1

FIG. 2 illustrates a schematic configuration of the imaging lens of Example 1 with optical paths of light passing through the imaging lens.

The imaging lens of Example 1 has a configuration corresponding to that of the imaging lens of the second embodiment. The imaging lens of Example 1 is configured to satisfy the conditional expressions (1), (3), (5), (6), (7), (8), (9), (10) but does not satisfy the conditional expressions (2), (4), (4').

Table 1 shows lens data of the imaging lens of Example 1. In the lens data shown in Table 1, the surface number i represents $i^{th}$ surface Si in which a number i (i=1, 2, 3, - - - ) is given to each surface in a serially increasing manner toward the image side with the most object side surface being taken as the first surface. In the lens data shown in Table 1, the surface number is given also to an aperture stop St and an optical element LL having no power.

The symbol Ri in Table 1 represents the radius of curvature of $i^{th}$ (i=1, 2, 3, - - - ) surface and the symbol Di represents the surface distance between $i^{th}$ surface and $(i+1)^{th}$ surface on the optical axis Z1. The symbols Ri and Di correspond to the symbol Si (i=1, 2, 3, - - - ) in number.

The "dt1" in the conditional expression (5): $0.3<dt1/f<0.8$ corresponds to the surface distance (thickness of the lens) represented by the symbol "D1" in the lens data described above.

The "dk2" in the conditional expression (6): $0<dk2/f<0.7$ corresponds to the surface distance represented by the symbol "D2" in the lens data described above.

The symbol Ndj represents the refractive index of $j^{th}$ optical element with respect to the d-line (587.6 nm) in which a number j (j=1, 2, 3, - - - ) is given to each optical element in a serially increasing manner toward the image side with the optical element on the most object side being taken as the first optical element, and vdj represents the Abbe number of $j^{th}$ optical element with respect to the d-line. In Table 1, the unit of the radius of curvature and the surface distance is mm, and the radius of curvature is positive if the surface is convex on the object side and negative if it is convex on the image side.

Here, the first optical element corresponds to the first group first lens L11, the second optical element corresponds to the second group first lens L21, the third optical element corresponds to the second group second lens L22, the fourth optical element corresponds to the second group third lens L23, and the fifth optical element corresponds the optical element LL having no power. The optical element LL having no power corresponds, for example, to a cover glass disposed on the light receiving surface of the image sensor or the like.

Because such optical systems as described above may generally maintain the predetermined performance even when the sizes of the optical elements, such as lenses and the like, are proportionally increased or decreased, imaging lenses in which the entire lens data described above are proportionally increased or decreased may also be the examples according to the present invention.

TABLE 1

| Example 1 Lens Data | | | | |
|---|---|---|---|---|
| Si | Ri | Di | Ndj | ν dj |
| 1 | −7.6230 | 2.50 | 1.834807 | 42.7 |
| 2 | 8.3333 | 1.15 | | |
| 3 | 14.7208 | 6.50 | 1.834807 | 42.7 |
| 4 | −9.9709 | 2.50 | | |
| (St)5 | ∞ | 2.50 | | |
| 6 | 11.1582 | 4.00 | 1.729157 | 54.7 |
| 7 | −5.8389 | 2.50 | 1.846660 | 23.8 |
| 8 | −23.2488 | 7.29 | | |
| 9 | ∞ | 2.41 | 1.516330 | 64.1 |
| 10 | ∞ | | | |

FIG. 7 illustrates spherical aberration, astigmatism, distortion, and lateral chromatic aberration of the imaging lens of Example 1. FIG. 7 illustrates aberrations for the light of d-line, F-line, and C-line. The diagram of astigmatism illustrates aberrations with respect to the sagittal image plane and the tangential image plane.

As illustrated in FIG. 7, the diagram indicated by the symbol a represents the spherical aberration, the diagram indicated by the symbol b represents the astigmatism, the diagram indicated by the symbol c represents the distortion, and the diagram indicated by the symbol d represents the lateral chromatic aberration.

The diagram of the distortion illustrates an amount of displacement from the ideal image height f×tan θ, where f is the focal length of the entire lens system and θ is the half angle of view (treated as variable, 0≤θ≤ω).

Table 6 at the end of the description of the Examples shows the value that can be obtained by the numerical expression in each conditional expression with respect to each of Examples 1 to 5. The value of the numerical expression in each conditional expression is the value with respect to the d-line (wavelength 587.56 nm) and may be obtained from the lens data of the imaging lens shown in Table 1 and the like.

Note that the above descriptions of how to interpret FIG. 2 illustrating the configuration of the imaging lens of Example 1, FIG. 7 illustrating the aberrations of the imaging lens, Table 1 illustrating the lens data of the imaging lens, correspondence between "dt1" in each conditional expression and "D1" in the lens data, correspondence between "dk2" in each conditional expression and "D2" in the lens data, and Table 6 showing the value of each numerical expression in each conditional expression apply to Examples 2 to 5 to be described later, so that the descriptions thereof for the Examples that follow will be omitted.

Example 2

FIG. 3 illustrates a schematic configuration of the imaging lens of Example 2. The imaging lens of Example 2 has a configuration corresponding to those of the imaging lenses of the first to the fourth embodiments. The imaging lens of Example 2 is configured to satisfy all of the conditional expressions (1), (2), (3), (4), (4') (5), (6), (7), (8), (9), (10).

FIG. 8 illustrates aberrations of the imaging lens of Example 2.

Table 2 given below shows lens data of Example 2.

TABLE 2

| Example 2 Lens Data | | | | |
|---|---|---|---|---|
| Si | Ri | Di | Ndj | ν dj |
| 1 | −13.7732 | 2.50 | 1.516330 | 64.1 |
| 2 | 3.9748 | 3.61 | | |
| 3 | 10.9651 | 6.50 | 1.743997 | 44.8 |
| 4 | −8.7697 | 0.50 | | |
| (St)5 | ∞ | 0.50 | | |
| 6 | 16.9378 | 2.99 | 1.620411 | 60.3 |
| 7 | −4.5156 | 2.50 | 1.846660 | 23.8 |
| 8 | −17.3587 | 6.99 | | |
| 9 | ∞ | 2.41 | 1.516330 | 64.1 |
| 10 | ∞ | | | |

Example 3

FIG. 4 illustrates a schematic configuration of the imaging lens of Example 3. The imaging lens of Example 3 has a configuration corresponding to those of the imaging lenses of the first to the fourth embodiments. The imaging lens of Example 3 is configured to satisfy all of the conditional expressions (1), (2), (3), (4), (4') (5), (6), (7), (8), (9), (10).

FIG. 9 illustrates aberrations of the imaging lens of Example 3.

Table 3 given below shows lens data of Example 3.

TABLE 3

| Example 3 Lens Data | | | | |
|---|---|---|---|---|
| Si | Ri | Di | Ndj | ν dj |
| 1 | −12.4074 | 1.95 | 1.516330 | 64.1 |
| 2 | 3.7700 | 2.86 | | |
| 3 | 11.9959 | 6.50 | 1.743997 | 44.8 |
| 4 | −7.7766 | 0.60 | | |
| (St)5 | ∞ | 0.50 | | |
| 6 | 18.1909 | 2.97 | 1.620411 | 60.3 |
| 7 | −4.4533 | 2.50 | 1.808095 | 22.8 |
| 8 | −14.7223 | 6.65 | | |
| 9 | ∞ | 2.41 | 1.516330 | 64.1 |
| 10 | ∞ | | | |

Example 4

FIG. 5 illustrates a schematic configuration of the imaging lens of Example 4. The imaging lens of Example 4 has a configuration corresponding to that of the imaging lens of the second embodiment. The imaging lens of Example 4 is configured to satisfy the conditional expressions (1), (3), (5), (6), (7), (8), (9), (10) but does not satisfy the conditional expressions (2), (4), (4').

FIG. 10 illustrates aberrations of the imaging lens of Example 4.

Table 4 given below shows lens data of Example 4.

TABLE 4

Example 4
Lens Data

| Si | Ri | Di | Ndj | ν dj |
|---|---|---|---|---|
| 1 | −7.6549 | 2.50 | 1.834807 | 42.7 |
| 2 | 7.6549 | 1.15 | | |
| 3 | 13.5382 | 6.50 | 1.834807 | 42.7 |
| 4 | −9.7830 | 2.50 | | |
| (St)5 | ∞ | 2.50 | | |
| 6 | 10.9353 | 4.00 | 1.729157 | 54.7 |
| 7 | −5.7927 | 2.50 | 1.846660 | 23.8 |
| 8 | −25.5605 | 7.19 | | |
| 9 | ∞ | 2.50 | 1.516330 | 64.1 |
| 10 | ∞ | | | |

Example 5

FIG. 6 illustrates a schematic configuration of the imaging lens of Example 5. The imaging lens of Example 5 has a configuration corresponding to those of the imaging lenses of the first to the fourth embodiments. The imaging lens of Example 3 is configured to satisfy all of the conditional expressions (1), (2), (3), (4), (4') (5), (6), (7), (8), (9), (10).

FIG. 11 illustrates aberrations of the imaging lens of Example 5.

Table 5 given below shows lens data of Example 5.

TABLE 5

Example 5
Lens Data

| Si | Ri | Di | Ndj | ν dj |
|---|---|---|---|---|
| 1 | −13.2793 | 2.18 | 1.516330 | 64.1 |
| 2 | 3.8297 | 2.43 | | |
| 3 | 14.8307 | 6.50 | 1.622992 | 58.2 |
| 4 | −6.9328 | 2.50 | | |
| (St)5 | ∞ | 0.50 | | |
| 6 | 15.6127 | 3.40 | 1.622992 | 58.2 |
| 7 | −5.2992 | 1.54 | 1.808095 | 22.8 |
| 8 | −14.0503 | 7.47 | | |
| 9 | ∞ | 2.41 | 1.516330 | 64.1 |
| 10 | ∞ | | | |

Table 6 given below shows the value that can be obtained by the numerical expression in each conditional expression.

TABLE 6

| Conditional Expression | Numerical Expression | Example 1 | Example 2 | Example 3 | Example 4 | Example 5 |
|---|---|---|---|---|---|---|
| (1) | f1/f | −0.69 | −0.92 | −0.91 | −0.67 | −0.89 |
| (2) | f1/fg2 | *−0.56 | −0.82 | −0.81 | *−0.55 | −0.74 |
| (3) | f1/fg2 − 1.6 * f1/f | 0.55 | 0.64 | 0.65 | 0.52 | 0.68 |
| (4) | |f1/f2| | *0.55 | 0.75 | 0.73 | *0.55 | 0.64 |
| (4') | |f1/f2| | *0.55 | 0.75 | 0.73 | *0.55 | 0.64 |
| (5) | dt1/f | 0.39 | 0.40 | 0.33 | 0.39 | 0.35 |
| (6) | dk2/f | 0.18 | 0.58 | 0.48 | 0.18 | 0.39 |
| (7) | fg2/f | 1.23 | 1.12 | 1.13 | 1.21 | 1.20 |
| (8) | νd1 | 42.7 | 64.1 | 64.1 | 42.7 | 64.1 |
| (9) | νd2 | 42.7 | 44.8 | 44.8 | 42.7 | 58.2 |
| (10) | dsi | 17.87 | 14.56 | 14.19 | 17.76 | 14.49 |

*indicates value that does not satisfy conditional expression.

As can be seen from the foregoing, the imaging lenses of Examples 1 to 5 have high optical performance and are compact imaging lenses having a wide angle of view.

FIG. 12 illustrates a schematic configuration of a surveillance camera, as an embodiment of the imaging apparatus of the present invention. The surveillance camera 200 illustrated in FIG. 12 includes an imaging lens 100 (e.g., imaging lens 101, 102, 103, 104, or the like) disposed in a substantially cylindrical lens barrel and an image sensor 210 that captures an optical image of a subject formed by the imaging lens 100. The optical image formed on the light receiving surface of the image sensor 210 through the imaging lens 100 is converted to an electrical signal Gs and outputted from the surveillance camera 200.

So far the present invention has been described by way of the first to the fourth embodiments and Examples, but the present invention is not limited to the embodiments and Examples described above and various modifications may be made. For example, values of the radius of curvature of each lens element, surface distance, refractive index, Abbe number, and the like are not limited to those shown in each Numerical Example and may take other values. For example, as a modification of the imaging lens having a cemented lens as shown in FIG. 1D, an imaging lens provided with a lens group having a refractive power disposed on the image side of the second lens group G2 may be cited.

In the embodiment of the imaging apparatus, the description and illustration have been made of a case in which the present invention is applied to a surveillance camera. But the present invention is not limited to such applications and is applicable, for example, to video cameras, electronic still cameras, in-vehicle cameras, and the like.

What is claimed is:

1. An imaging lens, consisting essentially of a first lens group having a negative refractive power and a second lens group having a positive refractive power, disposed in order from the object side, wherein:
the first lens group is composed of a first group first lens which is a single lens having a biconcave shape and a negative refractive power;
the second lens group is composed of a second group first lens having a positive refractive power, an aperture stop, a second group second lens having a positive refractive power, and a second group third lens having a negative refractive power, disposed in order from the object side;
the second group second lens and the second group third lens are cemented together to form a cemented lens; and the imaging lens satisfies a conditional expression (4a') given below:

$$0.62<|f1/f2|<0.82 \quad (4a'),$$

where:
f1: the focal length of the first group first lens; and
f2: the focal length of the second group first lens,
wherein
the second group first lens is a biconvex lens,
the second group second lens is a biconvex lens,
the second group third lens is a meniscus lens, and
an aperture stop is disposed between the second group first lens and the second group second lens, and the second group second lens and the second group third lens are cemented together to form a cemented lens.

2. The imaging lens of claim 1, wherein the imaging lens satisfies a conditional expression (4b') given below:

$$0.63<|f1/f2|<0.80 \quad (4b').$$

3. The imaging lens of claim 1, wherein the imaging lens satisfies a conditional expression (5) given below:

$$0.3<dt1/f<0.8 \quad (5),$$

where,
dt1: the thickness of the first group first lens on the optical axis, and
f is the focal length of the entire lens system at the d line.

4. An imaging lens, consisting essentially of a first lens group having a negative refractive power and a second lens group having a positive refractive power, disposed in order from the object side, wherein:
the first lens group is composed of a first group first lens which is a single lens having a biconcave shape and a negative refractive power;
the second lens group is composed of a second group first lens having a positive refractive power, an aperture stop, a second group second lens having a positive refractive power, and a second group third lens having a negative refractive power, disposed in order from the object side;
the second group second lens and the second group third lens are cemented together to form a cemented lens; and
the imaging lens satisfies a conditional expression (4a') given below:

$$0.62<|f1/f2|<0.82 \quad (4a'),$$

where:
f1: the focal length of the first group first lens; and
f2: the focal length of the second group first lens,
wherein the imaging lens satisfies a conditional expression (6) given below:

$$0<dk2/f<0.7 \quad (6),$$

where,
dk2: the distance (air equivalent distance) between the first group first lens and the second group first lens on the optical axis, and
f is the focal length of the entire lens system at the d line.

5. The imaging lens of claim 1, wherein the imaging lens satisfies a conditional expression (7) given below:

$$0<fg2/f<1.3 \quad (7),$$

fg2: the combined focal length of the entire second lens group, and
f is the focal length of the entire lens system at the d line.

6. The imaging lens of claim 1, wherein the imaging lens satisfies a conditional expression (8) given below:

$$38<vd1<70 \quad (8),$$

where,
vd1: the Abbe number of the first group first lens with reference to the d-line.

7. The imaging lens of claim 1, wherein the imaging lens satisfies a conditional expression (9) given below:

$$35<vd2<70 \quad (9),$$

where,
vd2: the Abbe number of the second group first lens with reference to the d-line.

8. An imaging lens, consisting essentially of a first lens group having a negative refractive power and a second lens group having a positive refractive power, disposed in order from the object side, wherein:
the first lens group is composed of a first group first lens which is a single lens having a biconcave shape and a negative refractive power;
the second lens group is composed of a second group first lens having a positive refractive power, an aperture stop, a second group second lens having a positive refractive power, and a second group third lens having a negative refractive power, disposed in order from the object side;
the second group second lens and the second group third lens are cemented together to form a cemented lens; and
the imaging lens satisfies a conditional expression (4a') given below:

$$0.62<|f1/f2|<0.82 \quad (4a'),$$

where:
f1: the focal length of the first group first lens; and
f2: the focal length of the second group first lens,
wherein the imaging lens satisfies a conditional expression (10) given below:

$$13.5<dsi<22 \quad (10),$$

where,
dsi: the distance between the aperture stop St and the image plane on the optical axis (the back focus portion is expressed in terms of air equivalent distance).

9. An imaging lens, consisting essentially of a first lens group having a negative refractive power and a second lens group having a positive refractive power, disposed in order from the object side, wherein:
the first lens group is composed of a first group first lens which is a single lens having a biconcave shape and a negative refractive power;
the second lens group is composed of a second group first lens having a positive refractive power, an aperture stop, a second group second lens having a positive refractive power, and a second group third lens having a negative refractive power, disposed in order from the object side;
the second group second lens and the second group third lens are cemented together to form a cemented lens; and
the imaging lens satisfies a conditional expression (4a') given below:

$$0.62<|f1/f2|<0.82 \quad (4a'),$$

where:
f1: the focal length of the first group first lens; and
f2: the focal length of the second group first lens,
wherein the imaging lens satisfies a conditional expression (4b') given below:

$$0.63<|f1/f2|<0.80 \quad (4b');$$

the second group first lens is a biconvex lens;
the second group second lens is a biconvex lens;
the second group third lens is a meniscus lens; and an aperture stop is disposed between the second group first lens and the second group second lens, and the second group second lens and the second group third lens are cemented together to form a cemented lens.

10. The imaging lens of claim 9, wherein the imaging lens satisfies a conditional expression (5) given below:

$$0.3 < dt1/f < 0.8 \tag{5},$$

where,
dt1: the thickness of the first group first lens on the optical axis, and
f is the focal length of the entire lens system at the d line.

11. The imaging lens of claim 9, wherein the imaging lens satisfies a conditional expression (6) given below:

$$0 < dk2/f < 0.7 \tag{6},$$

where,
dk2: the distance (air equivalent distance) between the first group first lens and the second group first lens on the optical axis, and
f is the focal length of the entire lens system at the d line.

12. The imaging lens of claim 9, wherein the imaging lens satisfies a conditional expression (7) given below:

$$0 < fg2/f < 1.3 \tag{7},$$

fg2: the combined focal length of the entire second lens group, and
f is the focal length of the entire lens system at the d line.

13. The imaging lens of claim 9, wherein the imaging lens satisfies a conditional expression (8) given below:

$$38 < vd1 < 70 \tag{8},$$

where,
vd1: the Abbe number of the first group first lens with reference to the d-line.

14. The imaging lens of claim 9, wherein the imaging lens satisfies a conditional expression (9) given below:

$$35 < vd2 < 70 \tag{9},$$

where,
vd2: the Abbe number of the second group first lens with reference to the d-line.

15. The imaging lens of claim 9, wherein the imaging lens satisfies a conditional expression (10) given below:

$$13.5 < dsi < 22 \tag{10},$$

where,
dsi: the distance between the aperture stop St and the image plane on the optical axis (the back focus portion is expressed in terms of air equivalent distance).

16. The imaging lens of claim 1, wherein the imaging lens satisfies a conditional expression (5) given below:

$$0.3 < dt1/f < 0.8 \tag{5},$$

where,
dt1: the thickness of the first group first lens on the optical axis, and
f is the focal length of the entire lens system at the d line.

17. The imaging lens of claim 1, wherein the imaging lens satisfies a conditional expression (6) given below:

$$0 < dk2/f < 0.7 \tag{6},$$

where,
dk2: the distance (air equivalent distance) between the first group first lens and the second group first lens on the optical axis, and
f is the focal length of the entire lens system at the d line.

18. The imaging lens of claim 1, wherein the imaging lens satisfies a conditional expression (7) given below:

$$0 < fg2/f < 1.3 \tag{7},$$

fg2: the combined focal length of the entire second lens group, and
f is the focal length of the entire lens system at the d line.

19. An imaging apparatus, comprising the imaging lens of claim 1.

* * * * *